US012623664B2

(12) United States Patent (10) Patent No.: US 12,623,664 B2
Okaya (45) Date of Patent: May 12, 2026

(54) VIBRATION SUPPRESSION CONTROL DEVICE

(71) Applicant: TOYOTA JIDOSHA KABUSHIKI KAISHA, Toyota (JP)

(72) Inventor: Shingo Okaya, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 18/973,174

(22) Filed: Dec. 9, 2024

(65) Prior Publication Data

US 2025/0187608 A1 Jun. 12, 2025

(30) Foreign Application Priority Data

Dec. 11, 2023 (JP) ................................. 2023-208736

(51) Int. Cl.
| | |
|---|---|
| *B60W 30/00* | (2006.01) |
| *B60W 10/02* | (2006.01) |
| *B60W 10/11* | (2012.01) |
| *B60W 20/00* | (2016.01) |
| *B60W 30/20* | (2006.01) |

(52) U.S. Cl.
CPC ............ *B60W 30/20* (2013.01); *B60W 10/02* (2013.01); *B60W 10/11* (2013.01); *B60W 20/00* (2013.01); *B60W 2510/081* (2013.01); *B60W 2510/083* (2013.01); *B60W 2520/00* (2013.01); *B60W 2520/28* (2013.01); *B60W 2710/021* (2013.01); *B60W 2710/10* (2013.01)

(58) Field of Classification Search
CPC ...... B60W 30/20; B60W 10/02; B60W 10/11; B60W 20/00; B60W 2510/081; B60W 2510/083; B60W 2520/00; B60W 2520/28; B60W 2710/021; B60W 2710/10; B60W 2710/083; B60W 10/08; B60W 20/15; B60W 2050/0031; B60W 2050/0037; B60W 30/19; B60W 2050/0024; B60W 2510/0638; B60W 2510/0657; B60W 20/11; B60W 50/00; B60W 2720/28; B60K 2006/4833; B60K 6/547; B60K 2006/4808; B60K 6/48
See application file for complete search history.

(56) References Cited

U.S. PATENT DOCUMENTS

2017/0334448 A1* 11/2017 Schwunk .............. B60W 10/08
2021/0163012 A1* 6/2021 Ko ........................ B60W 30/20

FOREIGN PATENT DOCUMENTS

JP H11-031015 A 2/1999

* cited by examiner

*Primary Examiner* — Ian Jen
(74) *Attorney, Agent, or Firm* — Dinsmore & Shohl LLP

(57) ABSTRACT

A vibration-suppression control device includes a processor calculating a rotation speed of a tire using an observer model including an observer model constant, and adding a damping torque, in which a gain adjustment corresponding to a gain constant is performed on a difference between the rotational speed of the tire and a rotational speed of the motor, to a torque of the motor. Further, the observer model constant is set in advance in a manner that the observer model constant in a state of during shifting is different from the observer model constant in a state of after shifting, and the processor uses the observer model, in which the observer model constant is switched between the state of during shifting and the state of after shifting.

4 Claims, 2 Drawing Sheets

VIBRATION SUPPRESSION CONTROL DEVICE

CROSS-REFERENCE TO RELATED APPLICATION(S)

The present application claims priority to and incorporates by reference the entire contents of Japanese Patent Application No. 2023-208736 filed in Japan on Dec. 11, 2023.

BACKGROUND

The present disclosure relates to a vibration-suppression control device.

Japanese Laid-open Patent Publication No. H11-031015 discloses a control method of suppressing the residual vibration by estimating the estimated load rotational speed of the load converted into the rotational speed of the motor shaft based on a control model predetermined by the observer, obtaining the deviation between the motor rotational speed and the estimated load rotational speed, and by adding the correction value obtained by multiplying the gain to the deviation to the speed command amount vibration.

As described in Japanese Laid-open Patent Publication No. H11-031015, the control model used in the observer is expressed using the natural frequency of the vibration system of interest.

SUMMARY

There is a need for providing a vibration-suppression control device capable of appropriately suppressing vibration during and after shifting by a stepped transmission.

According to an embodiment, a vibration-suppression control device for a vehicle including an engine, a stepped transmission connected to the engine, and a motor connected to an output shaft side of the stepped transmission, includes a processor which calculates a rotation speed of a tire using an observer model including an observer model constant, and adds a damping torque, in which a gain adjustment corresponding to a gain constant is performed on a difference between the rotational speed of the tire and a rotational speed of the motor, to a torque of the motor. Further, the observer model constant is set in advance in a manner that the observer model constant in a state of during shifting in which a clutch of the stepped transmission is separated is different from the observer model constant in a state of after shifting where the clutch of the stepped transmission is connected, and the processor uses the observer model, in which the observer model constant is switched between the state of during shifting and the state of after shifting.

DETAILED DESCRIPTION

In a vehicle in which a stepped transmission is connected to an engine and a motor is connected to the output shaft side of the stepped transmission, the resonance frequency (natural frequency) differs between during and after the transmission by the stepped transmission. Therefore, in this vehicle, if the same control model as that after shifting is used even during shifting, the vibration may be amplified.

A vibration-suppression control device according to an embodiment of the present disclosure will be described with reference to the drawings. In addition, components in the following embodiments include those which can be substituted and easily by those skilled in the art, or those which are substantially the same.

EMBODIMENTS

Configuration of the Vehicle

Figure 1:
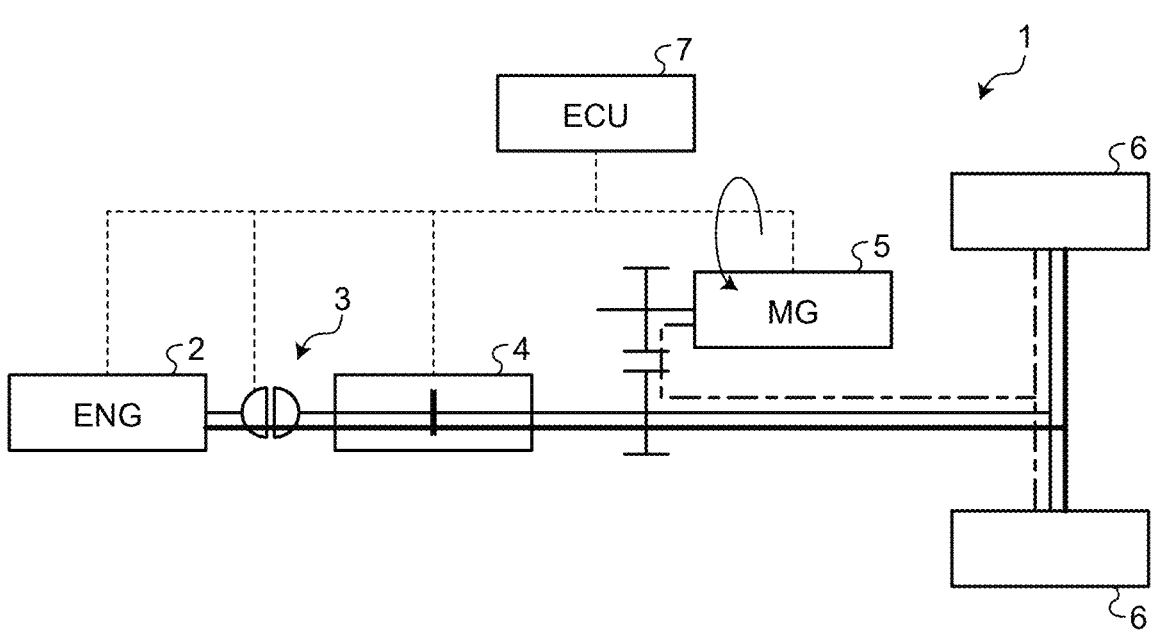
FIG. 1 is a schematic configuration diagram of a vehicle including a vibration-suppression control device according to an embodiment.

FIG. 1 is a schematic configuration diagram of a vehicle including a vibration-suppression control device according to an embodiment. The vehicle 1 includes an engine 2, a torque converter 3, a stepped transmission 4, a motor 5, a tire 6, and an Electronic Control Unit (ECU) 7.

The vehicle 1 is, for example, a traction vehicle capable of towing a trailer, but is not limited to a traction vehicle.

The engine 2 is an internal combustion engine such as a gasoline engine or a diesel engine, and is driven by combustion of fuel to output torque. Torque from the engine 2 is transmitted to the tire 6 via the torque converter 3 and the stepped transmission 4.

The torque converter 3 is connected to the engine 2, and transmits the torque from the engine 2 to the stepped transmission 4 by amplifying the torque.

The stepped transmission 4 is connected to the engine 2 through the torque converter 3, and changes the ratio between the input rotational speed and the output rotational speed stepwise to transmit the torque from the torque converter 3 to the tire 6. The stepped transmission 4 is an 8-step Automatic Transmission (AT), but the number of stages is not particularly limited.

The motor 5 is connected to the output shaft side of the stepped transmission 4, and has a function as a generator to generate electricity by being driven by receiving the torque output by the engine 2 (power generation function), and also has a function as an electric motor to output torque by being driven by electric power is supplied (electric motor function). The motor 5 is a motor generator, for example, a permanent magnet synchronous motor, or is constituted by an induction motor or the like.

The ECU 7 controls the vehicles 1. The ECU 7 is configured with a processor having a memory and hardware such as a Central Processing Unit (CPU).

Torsional Resonant Frequency of Vehicle

FIG. 1 shows the state in which the clutch of the stepped transmission 4 is connected. After the speed change, the clutch of the stepped transmission 4 is connected, and the driving train for transmitting the torque from the engine 2 indicated by the thick line to the torque converter 3, the stepped transmission 4, and the tire 6, and the driving train for transmitting the torque from the motor 5 indicated by the chain line to the tire 6 are connected respectively. At this time, the resonance frequency of the torsional resonance of the vehicle 1 is calculated for the resonance system including the engine 2, the torque converter 3, the stepped transmission 4, the motor 5, and the tire 6, and the resonance frequency of the vehicle 1 becomes, for example, about 5 Hz.

Figure 2:
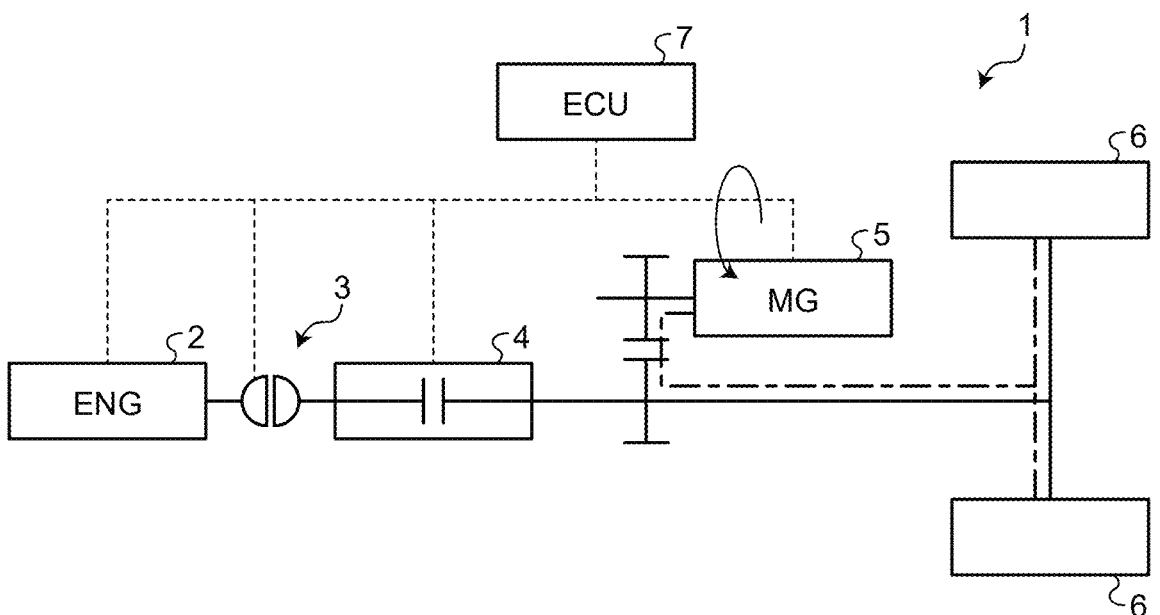
FIG. 2 is a view illustrating a state in which a clutch of a stepped transmission is separated.

FIG. 2 is a view illustrating a state in which the clutch of the stepped transmission is separated. During the transmission, the clutch of the stepped transmission 4 is separated, and only the driving train that transmits the torque from the motor 5 shown by a one-dot chain line to the tire 6 is connected. At this time, the resonance frequency of the torsional resonance of the vehicle 1 is calculated for the resonance system including the motor 5 and the tire 6, the resonance frequency of the vehicle 1 is, for example, about 8 Hz.

As described above, the resonance frequency of the torsional resonance of the vehicle 1 is different between after the shift and during the shift.

Treatment in ECU

Figure 3:
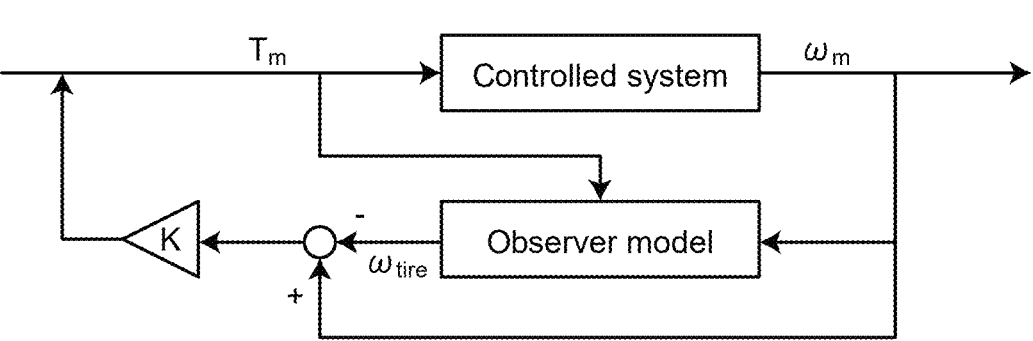
FIG. 3 is a schematic representation of a process in an ECU.

FIG. 3 is a schematic representation of a process in the ECU. As illustrated in FIG. 3, the ECU 7 acquires the torque $T_m$ of the motor 5 and the rotational speed of the motor 5 as $\omega_m$, and calculates the rotational speed $\omega_{tire}$ of the tire using an observer model including the observer model constant.

Furthermore, the ECU 7 calculates a damping torque in which a gain adjustment corresponding to a gain constant is performed on a difference between the calculated rotational speed $\omega_{tire}$ of the tire and the rotational speed $\omega_m$ of the motor 5. The ECU 7 adds the calculated damping torque to the torque $T_m$ of the motor 5 and inputs it to a control system that controls the driving of the motor 5, thereby executing damping control of the vehicle 1.

Here, the observer model calculates the rotational speed $\omega_{tire}$ of the tire using the observer model constant which is calculated according to the resonance frequency of the vehicle 1. Therefore, the ECU 7 has an observer model constant that differs between during and after speed change, and the observer model constant that is switched between during and after speed change is used in advance. As a result, according to the embodiment, it is possible to appropriately suppress the vibration during and after the speed change by the stepped transmission 4.

Incidentally, when the vehicle 1 is a towing vehicle, the resonance frequency of the hitch member resonance is about 8 Hz, and is about the same as the resonance frequency of the vehicle 1 during the speed change. Therefore, if an observer model having the same observer model constant as that after shifting is used even during shifting, torsional resonance of the vehicle 1 in 8 Hz cannot be suppressed, and thus torsional resonance and hitch member resonance of the vehicle 1 in 8 Hz amplify vibration to each other. In contrast, according to the embodiment, since it is possible to suppress the torsional resonance of the vehicle 1 during the speed change, it is possible to suppress such resonance.

Further, the ECU 7 performs gain adjusting in accordance with the gain constant calculated in accordance with the resonant frequency of the vehicle 1. Therefore, the ECU 7 has a gain constant that differs between the shifting and the shifting in advance, and performs gain adjusting in which the gain constant is switched between the shifting and the shifting. As a result, according to the embodiment, it is possible to appropriately suppress the vibration during and after the speed change by the stepped transmission 4.

Further effects and variations can be readily derived by one skilled in the art. Thus, the broader aspects of the disclosure are not limited to the particular details and representative embodiments described and represented above. Accordingly, various modifications are possible without departing from the spirit or scope of the overall concept defined by the appended claims and their equivalents.

According to the present disclosure, it is possible to realize a vibration suppression control device capable of appropriately suppressing vibration during and after transmission by a stepped transmission.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vibration-suppression control device for a vehicle including an engine, a stepped transmission connected to the engine, and a motor connected to an output shaft side of the stepped transmission, the vibration-suppression control device comprising a processor configured to calculate a rotation speed of a tire using an observer model including an observer model constant, and add a damping torque, in which a gain adjustment corresponding to a gain constant is performed on a difference between the rotational speed of the tire and a rotational speed of the motor, to a torque of the motor, wherein the observer model constant is set in advance in a manner that the observer model constant in a state of during shifting in which a clutch of the stepped transmission is separated is different from the observer model constant in a state of after shifting where the clutch of the stepped transmission is connected, and the processor is configured to use the observer model, in which the observer model constant is switched between the state of during shifting and the state of after shifting.

2. The vibration-suppression control device according to claim 1, wherein the gain constant is set in advance in a manner that the gain constant in the state of during shifting is different from the gain constant in the state of after shifting, and the processor is configured to perform the gain adjustment in which the gain constant is switched between the state of during shifting and the state of after shifting.

3. The vibration-suppression control device according to claim 2, wherein the observer model constant and the gain constant are calculated in accordance with a resonance frequency of the vehicle.

4. The vibration-suppression control device according to claim 1, wherein the vehicle is a traction vehicle capable of towing a trailer.

\* \* \* \* \*